United States Patent [19]

Kitao et al.

[11] Patent Number: 5,512,423
[45] Date of Patent: Apr. 30, 1996

[54] OPTICAL INFORMATION RECORDING MEDIUM

[75] Inventors: Teijiro Kitao, Tondabayashi; Hironori Oda, Nagoya, both of Japan

[73] Assignee: Canon Kabushiki Kaisha, Tokyo, Japan

[21] Appl. No.: 191,717

[22] Filed: Feb. 4, 1994

Related U.S. Application Data

[63] Continuation of Ser. No. 22,749, Feb. 19, 1993, abandoned, which is a continuation of Ser. No. 502,919, Apr. 2, 1990, abandoned.

[30] Foreign Application Priority Data

May 18, 1989 [JP] Japan ..................... 1-122867

[51] Int. Cl.$^6$ ..................... G03C 1/73
[52] U.S. Cl. ............. 430/345; 430/270.16; 430/271.1; 430/341; 430/495.1
[58] Field of Search ..................... 430/345, 462, 430/336, 945, 270, 271, 495

[56] References Cited

U.S. PATENT DOCUMENTS

| | | | |
|---|---|---|---|
| 3,964,911 | 6/1976 | Robillard | 430/336 |
| 4,010,833 | 3/1977 | Metzger | 430/345 |
| 4,485,968 | 11/1984 | Arakawa et al. | 430/345 |
| 4,565,779 | 1/1986 | Arakawa et al. | 430/962 |
| 4,626,496 | 12/1986 | Sato | 430/271 |
| 4,794,068 | 12/1988 | Mayazaki et al. | 430/962 |

FOREIGN PATENT DOCUMENTS 0230024 7/1987 European Pat. Off. .
2216676 10/1989 United Kingdom .

OTHER PUBLICATIONS

Influence of Ampho–Counter Ion and Fading Due to Light of Spiropyran, Chemical Society of Japan, 58th Spring Annual Convention, Preprints II (Mar. 14, 1989) 1874, upper column, 3 III H 27.

Tokyo Kasei Company, Limited Catalog 30, Organic Chemicals, 1990.

*Primary Examiner*—Thorl Chea
*Attorney, Agent, or Firm*—Fitzpatrick, Cella, Harper & Scinto

[57] ABSTRACT

An optical information recording medium improved in storage stability and thermal stability, having a base and a recording layer, the recording layer containing a spiropyran compound and at least one carboxylic acid metallic complex expressed by general formulae [I] and [II]:

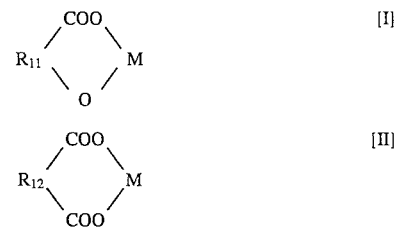

where M represents a metallic element and each of $R_{11}$ and $R_{12}$ represents an alkylene group, an alkylidene group, an aromatic ring, an aliphatic ring, or a heterocyclic ring.

6 Claims, 1 Drawing Sheet

OPTICAL INFORMATION RECORDING MEDIUM

This application is a continuation of application Ser. No. 08/022,749 filed Feb. 19, 1993, now abandoned, which in turn is a continuation of application Ser. No. 07/502,919 filed Apr. 2, 1990, now abandoned.

BACKGROUND OF THE INVENTION

1. Field of the Invention

This invention relates to a rewritable optical information recording medium which can be used for writing, erasing of recorded data and rerecording with controlled laser light.

2. Description of the Prior Art

Photochromic materials are known as a kind of material capable of changing its color in a reversible manner. Photochromic materials are used, for example, for optical recording mediums as described in the report of the investigation of optical disk memory materials, March 1982, Nippon Denshi Kogyo Shinko Kyokai, 182.

The use of this kind of optical recording medium will be briefly described below. Laser light having a wavelength $\lambda_a$ is condensed to a recording layer which is formed on a surface of a base and which contains a photochromic coloring matter in a color-extinguished state (color-extinguished seed). A photochromic reaction of the coloring matter is thereby brought about at the spot irradiated with the laser light, and the coloring matter is changed into a color-developed seed having a maximum absorption at a wavelength $\lambda_b$, thereby recording information. To read out the recorded information, the recording layer is irradiated with laser light having the wavelength $\lambda_b$ but weak enough to avoid occurrence of a photochromic reaction, and the intensity of transmission light or reflection light thereby obtained is detected.

Strong laser light having the wavelength $\lambda_b$ may be used for the same operation as writing to erase the written information by changing the color-developed seed into a color-extinguished seed, thereby enabling rewriting of information.

However, ordinary photochromic coloring matters are very unstable in colored states and spontaneously discolor easily even during storage in a dark place. For this reason, optical information recording mediums in which photochromic coloring matters are used are not capable of maintaining information for a long period of time.

A method for solving this problem has been tried in which an antioxidant for preventing oxidation of plastics, e.g., a phenolic antioxidant, is added to the coloring matter. However, the addition of a phenolic antioxidant entails some drawbacks. That is, the coloring density (optical density) of the photochromic coloring matter is reduced and the wavelength of the maximum absorption in the color-developed seed (colored state) is shifted to the short wavelength side. In particular, it is disadvantageous to shift the maximum absorption wavelength of the color-developed seed to the short wavelength side where the photochromic material is used as a medium for both recording and reproduction using a semiconductor laser.

Japanese Patent Laid-Open No. 62-147453 discloses that an optical recording medium capable of being stably maintained in a color-developed state can be obtained by using a mixture of a photochromic spiropyran compound and a compound having a polarity or, more specifically, a carboxylic acid.

SUMMARY OF THE INVENTION

It is an object of the present invention to provide an optical information recording medium having a color-developed seed of a photochromic spiropyran compound with improved storage stability and thermal stability without reducing the optical density of the color-developed seed and without shifting the maximum absorption wavelength of the color-developed seed to the short wavelength side.

It is another object of the present invention to provide an optical information recording medium which can be used for erasing written information or rerecording information using controlled laser light.

To these ends, the present invention provides an optical information recording medium having a base and a recording layer, the recording layer containing a spiropyran compound and at least one of the carboxylic acid metallic complexes expressed by the following general formulae [I] and [II]:

General Formula [I]

General Formula [II]

where M represents a metallic element and each of $R_{11}$ and $R_{12}$ represents an alkylene group, an alkylidene group, an aromatic ring, an aliphatic ring, or a heterocyclic ring.

DESCRIPTION OF THE PREFERRED EMBODIMENTS

The present invention provides an optical information recording medium having a recording layer containing both a photochromic spiropyran compound and a carboxylic acid metallic complex.

The carboxylic acid metallic complex in accordance with the present invention is, preferably, a compound represented by the following general formula [I] or [II]:

[I]

[II]

In the formulae [I] and [II], each of $R_{11}$ and $R_{12}$ represents an alkylene group, an alkylidene group, a substituted or unsubstituted aromatic ring, a substituted or unsubstituted aliphatic ring, or a substituted or unsubstituted heterocyclic ring. The alkylene group is, for example, methylene, ethyl- ene, propylene, trimethylene, butylene, amylene, or hexylene and it may be a bivalent atomic group having an unsaturated bond, e.g., vinylene, propenylene or butenylene. The alkylidene group is, for example, ethylidene, propylidene, isopropylidene, butylidene or pentylidene. The aromatic ring is, for example, a benzene ring or a naphthalene ring. The aliphatic ring is, for example, a cyclobutane ring, a cyclopentane ring, a cyclohexane ring, a cycloheptane ring, a cyclobutene ring, a cyclopentene ring, a cyclohexene ring or a cycloheptene ring. The heterocylic ring is, for example, a furan ring, a benzofuran ring, a pyrrole ring, a thiophene ring, a pyridine ring, a quinoline ring or a thiazole ring. Of these examples, each of the alkylene and alkylidene groups having a number 2 to 4 carbon atoms, substituted or unsubstituted benzene rings and 5-member, 6-member and 7-member aliphatic rings or hetrocylic rings may preferably used as $R_{11}$ or $R_{12}$. Specifically, the use of a substituted or unsubstituted naphthalene ring as $R_{11}$, i.e., the use of a metallic salt of hydroxynaphthoic acid as the carboxylic acid metallic complex in accordance with the present invention is particularly effective in limiting the photo-discoloration of the color-developed seed of spiropyran and in limiting the dark place color extinction reaction. Also, a metallic salt of 1-hydroxy-2-naphthoic acid or 2-hydroxy- 3-naphthoic acid is further effective in limiting the discoloration.

The metallic element M in the above formulae [I] and [II] is, preferably, a transition metal such as Zn, Cu, Ni, Co, Pd or Zr. Specifically, Zn may preferably be used to prevent of discoloration of the spiropyran compound caused by light or heat.

Examples of carboxylic acid metallic complexes in accordance with the present invention are shown below. Examples of compounds expressed by general formula [I]

-continued

Examples of compounds expressed by general formula [II]

-continued

The spiropyran compound used for the optical information recording medium in accordance with the present invention is, preferably, a compound expressed by a general formula [III]:

In the general formula [III], X represents substituted or unsubstituted C, N, O, S or Se; Y represents S or O; and Z represents substituted or unsubstituted C or N. Each of the rings A and B represents an aromatic ring or a heterocyclic ring, such as a benzene ring or a naphthalene ring, each of which may be substituted. Each of $R_1$ and $R_2$ represents a hydrogen atom, a halogen atom or a univalent organic residue such as an alkyl group, an alkenyl group, an aryl group or an arylalkyl group.

Among spiropyran compounds expressed by the general formula [III], compounds expressed by general formula [IV], [V], or [VI] shown below are particularly preferable.

General Formula [IV]:

General Formula [V]:

General Formula [VI]:

In the general formulae [IV], [V], and [VI], each of $R_1$ to $R_{10}$ represents a hydrogen atom, a halogen atom, e.g., a chlorine atom, a bromine atom, an iodine atom, a fluorine atom or a univalent organic residue. The univalent organic residue can be selected from various groups. Specifically, it may be selected from alkyl groups, e.g., methyl, ethyl, n-propyl, iso-propyl, n-butyl, t-butyl, n-amyl, n-hexyl, n-octyl, 2-ethylhexyl, t-octyl, n-octadecyl and dodecyl; alkoxy groups, e.g., methoxy, ethoxy, propoxy, butoxy and octoxy; an alkenyl group, e.g., vinyl, propenyl, butenyl, pentenyl, heptenyl, hexenyl and octenyl; aryl groups, e.g., phenyl, tolyl, xylyl, ethylphenyl, methoxyphenyl, ethoxyphenyl, chlorophenyl, nitrophenyl, dimethylaminophenyl, α-naphthyl and β-naphthyl; an arylalkyl group, e.g., benzyl, 2-phenylethyl, 2-phenyl-1-methylethyl, bromobenzyl, 2-bromophenylethyl, methylbenzyl, methoxybenzyl and nitrobenzyl; acyl groups, e.g., acetyl, propionyl, butyryl, valeryl, benzoyl, trioyl, naphthoyl, phthaloyl and furoyl; amino groups, e.g., amino, dimethylamino, diethylamino, dipropylamino, acetylamino and benzoylamino; styryl groups, e.g., styryl, dimethylaminostyryl, diethylaminostyryl, dipropylaminostyryl, methoxystyryl, ethoxystyryl and styrylmethyl; alkoxycarbonyl groups, e.g., methoxycarbonyl, ethoxycarbonyl, propoxycarbonyl and butoxycarbonyl; nitro groups, hydroxy groups, carboxyl groups, mercapto groups, thioether groups, carboxyl groups and cyano groups.

Each of combinations of $R_3$ and $R_4$, $R_4$ and $R_5$, $R_5$ and $R_6$, $R_7$ and $R_8$, $R_8$ and $R_9$, and $R_9$ and $R_{10}$ may constitute a substituted or unsubstituted fused ring which is, preferably, a 5-member, 6-member or 7-member fused ring. Such a fused ring may be an aromatic ring, e.g., benzene, naphthalene, chlorobenzene, bromobenzene, methylbenzene, ethylbenzene, methoxybenzene, ethoxybenzene or aniline, a hetorocyclic ring, e.g., a furan ring, a benzofuran ring, a pyrrole ring, a thiophene ring, a pyridine ring, a quinoline ring or a thiazole ring; or an aliphatic ring, e.g., dimethylene, trimethylene and tetramethylene.

X represents

N, O, S, Se, and $R_{13}$ and $R_{14}$ may be the same or different from each other and is defined to express the same element or group as $R_1$ to $R_{10}$.

Examples of spiropyran compounds which may be used in accordance with the present invention are shown below.

In accordance with the present invention, the content of the carboxylic acid metallic complex is 1 to 60% by weight or, more preferably, 5 to 50% by weight of the total amount of the recording material, i.e., carboxylic acid metallic complex and spiropyran compound, included in the recording layer.

In accordance with the present invention, the spiropyran compound is dissolved in a solvent which is selected from alcohols, such as methanol, ethanol and isopropyl alcohol; ketones, such as acetone, methyl ethyl ketone and cyclohexane; ethers, such as ethyl ether, dioxane and tetrahydrofuran; esters, such as ethyl acetate and n-butyl acetate; aromatic compounds such as benzene, toluene, xylene; and n-hexane, cyclohexane, acetonitrile, dimethylformamide, dimethyl sulfoxide and chloroform, or a combination of some of these solvents. To form the recording layer, the spiropyran compound is dissolved in the solvent together with a high molecular weight polymer, and the solution is processed to form a film or is applied to a base and dried. Alternatively, the spiropyran compound may be mixed and dissolved in a high molecular weight polymer without using any solvent to form a film. The high molecular weight polymer may be of any type so long as it has good compatibility with the spiropyran compound expressed by the general formula [III] and has properties suitable for film formation. The polymers may be selected from methyl polymethacrylate, polystyrene, polyvinyl acetate, polyvinyl butyral, cellulose (e.g., cellulose ether, cellulose ester and other cellulose derivatives), polyvinyl chloride, polyvinylidene chloride, vinyl chloride-vinyl acetate copolymer, vinyl chloride-vinylidene acetate copolymer, polypropylene, polyethylene, polyacrylonitrile, urethane resin, epoxy resin, polyester, phenolic resin and phenoxy resin. Specifically; cellulose may be preferably used as the polymeric material because it improves the stability of the color-developed seed.

The material of the base may be polyethylene terephthalate, cellulose acetate, polycarbonate, polyolefin, polymethyl methacrylate, epoxy, ordinary paper, barayta paper, glass or metal.

Figure 1:
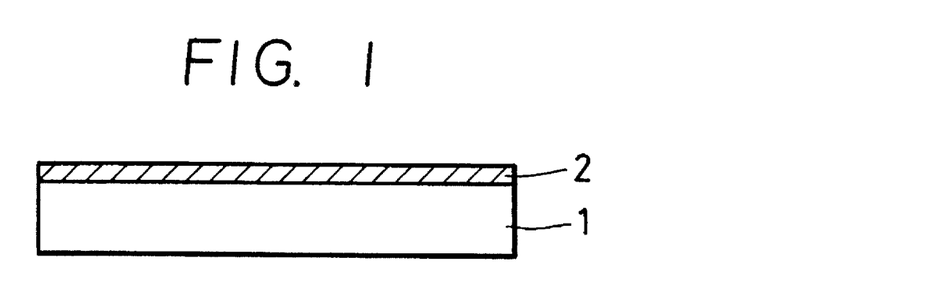
FIGS. 1 to 4 are schematic cross-sectional views of optical information recording mediums which represent an embodiment of the present invention.

Referring to FIG. 1, the optical information recording medium in according to the present invention can be provided by forming on a base 1 a recording layer 2 containing the spiropyran compound and the carboxylic acid metallic complex expressed by the general formulae [I] and/or [II].

Figure 2:
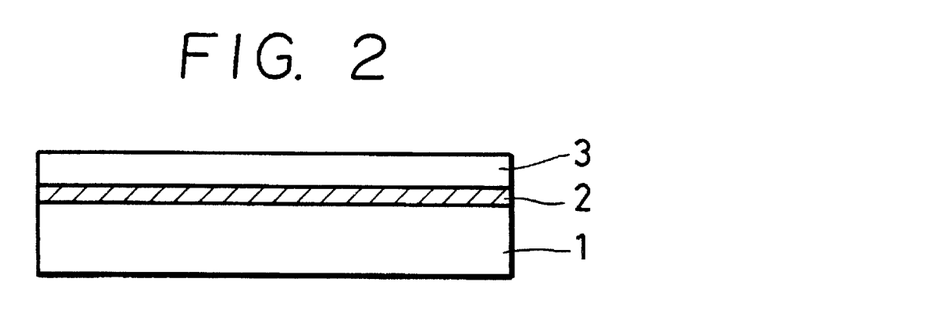

As shown in FIG. 2, a transparent protective layer 3 through which recording/reproduction laser light can be transmitted may be formed on the recording layer 2. The protective layer 3 may be opaque if the recording layer is irradiated with light from the side of the base 1.

Figure 3:
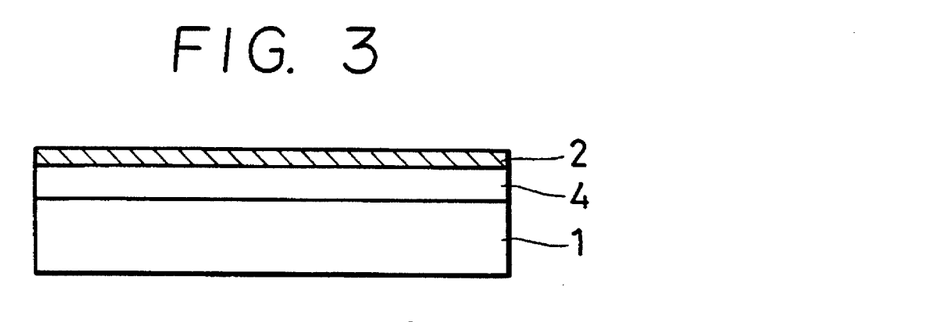

As shown in FIG. 3, an undercoat layer 4 may be formed between the base 1 and the recording layer 2.

Figure 4:
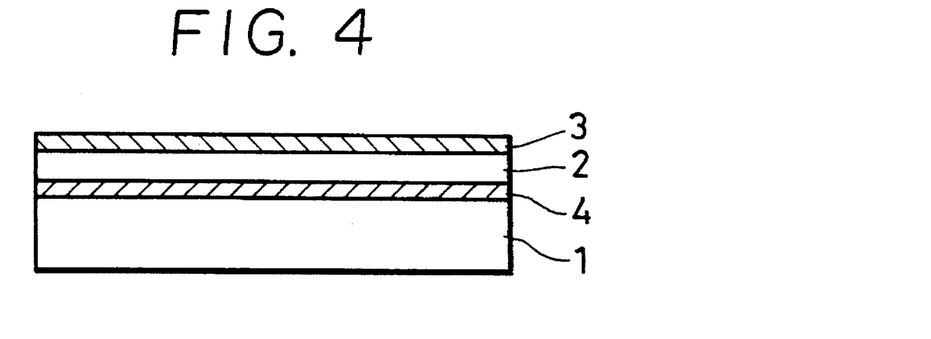

The protective layer 3 and the undercoat layer 4 may be used together, as shown in FIG. 4.

The undercoat layer is provided for the purposes of: (a) improving the adhesion between the base and the recording layer, (b) forming a barrier against water or gases, (c) improving the storage stability of the recording layer, (d) improving the reflectivity, (e) protecting the base from the solvent, (f) forming pregrooves, and/or (g) improving the absorption of light. To achieve object (a), the undercoat material may be selected from various materials such as polymeric materials, e.g., ionomer resin, polyamid resin, vinyl resin, natural high molecular weight polymers, silicone and liquid rubber, or a silane coupling agent. To achieve objects (b) and (c), the undercoat material may be selected from, as well as the polymeric materials, inorganic compounds, e.g., $SiO_2$, $MgF_2$, SiO, $TiO_2$, ZnO, ZnS, TiN and SiN, and metals or semimetals, e.g., Zn, Cu, S, Ni, Cr, Ge, Se, Cd, Ag and Al. To achieve object (d), the undercoat material may be selected from metals, e.g., Al and Ag, and organic thin films having metallic gloss, e.g., cyanine dye and methine dye. To achieve objects (e) and (f), the undercoat material may be selected from ultraviolet-setting resins, thermosetting resins and thermoplastic resins. To achieve object (g), a high refractive index layer such as a dielectric layer may be used as the undercoat layer in order to increase the absorption of light by increasing the interference of the laser light. The thickness of the undercoat layer is 50 Å to 100 μm or, preferably, 200 Å to 30 μm.

The protective layer is formed to protect the recording layer from scratching, dust contamination and the like and to improve the storage stability and reflectivity of the recording layer. The material of the protective layer may be the same as the undercoat layer. The thickness of the protective layer is 100 Å or more or, preferably, 100 Å or more.

The undercoat layer and/or the protective layer may contain the spiropyran compound expressed by the general formula [III]. Also, the undercoat layer or the protective layer may contain a stabilizer, a dispersant, a fire retardant, a lubricant, an antistatic agent, a surfactant, a plasticizer and so on.

The optical information recording medium in accordance with the present invention can also be constructed in a different way. That is, an air gap structure may be adopted in which two recording medium members having the same construction as one of those shown in FIGS. 1 to 4 (one of which members may be constituted by a base alone in some cases) are attached to each other with a spacer disposed therebetween and with the recording mediums placed inside. Alternatively an adhesion structure may be adopted in which the two members are adhered to each other with a protective layer 3 interposed therebetween.

To record information on the optical information recording medium in accordance with the present invention, the recording medium may be selectively irradiated with light having a wavelength $\lambda_a$ at which the color-extinguished seed of the spiropyran compound has the maximum absorption, so that only the irradiated portions are set in a color-developed state, thereby recording information. The color-developed seed can be returned to the color-extinguished seed by being irradiated with light having a wavelength $\lambda_b$, at which the color-developed seed has the maximum absorption, thereby erasing the information. Another recording method may be used in which the whole surface of the optical information recording medium is irradiated with light having the wavelength $\lambda_a$ at which the color-extinguished seed of the spiropyran compound has the maximum absorption to set the recording layer in a color-developed state over the whole surface, and the recording layer is selectively irradiated with light having the wavelength $\lambda_b$, so that only the irradiated portions are set in a color-extinguished state, thereby recording information. The color-extinguished seed can be changed into the color-developed seed by being irradiated with light having the wavelength $\lambda_a$, thereby erasing the information.

The light used to record or erase information may be selected in accordance with the maximum absorption wavelength of the color-extinguished or color-developed seed of the spiropyran compound. For example, a gas laser, such as a He—Ne laser or an Ar laser, or a semiconductor laser may be employed, and it is possible to effect recording/reproduction with one laser by using a combination of this type of laser and a second harmonic generator element or a third harmonic generator element and selecting one of two different irradiating wavelengths.

In accordance with the present invention, as described above, a photon mode rewritable organic recording medium has been realized based on the addition of a specific carboxylic acid metallic complex, which medium ① is remarkably improved in the storage stability and the photostability of the color-developed seed of the spiropyran compound after irradiation with ultraviolet rays;

② has improved characteristics free from shifting of the maximum light absorption wavelength of the color-developed seed to the short wavelength side as well as from reduction in the coloring density; and

③ can be used for recording, erasing and rerecording under control.

EXAMPLES OF THE INVENTION

Examples of the present invention will be described below in detail. The following examples are intended to illustrate, not limit, the present invention.

Example 1

3 parts by weight of the spiropyran compound No.[VI]-(3), 0.3 part by weight of zinc salt of 1-hydroxy-2-naphthoic acid expressed by a formula:

provided as a carboxylic acid metallic complex and 10 parts by weight of vinyl chloride-vinylidene chloride copolymer (Denkavinyl #1000W: a product of Denki Kagaku Kogyo K. K) were dissolved in 100 parts by weight of a solvent consisting of a mixture of tetrahydrofuran and cyclohexane mixed at a ratio of 2:1 (by volume). This solution was applied to a glass base by spin coating and was dried in a vacuum at 75° C. for an hour, thereby forming an optical information recording medium with a recording layer having a thickness of 1000 Å. This medium was selectively irradiated with ultraviolet rays having a wavelength of about 360 nm by using a 500 Watt ultrahigh voltage mercury lamp (manufactured by Ushio Inc.) and filters (UV-36C, IRA-255: products of Toshiba Corp.). The irradiated portion was color-developed in deep green ($\lambda$max=610 nm) in a saturated color-developed state.

When the recording layer in the colored state was irradiated with visible rays, the spiropyran was restored to its original state. It was thereby confirmed that the recording layer has a recording function. This change could be observed during repeated use of the recording medium.

The photostability and the storage stability of this optical information recording medium were evaluated. For evaluation of the photostability, the optical information recording medium was selectively irradiated with ultraviolet rays so as to be set in a saturated color-developed state as described above and, during continued irradiation of the same ultraviolet rays thereafter, the time in which the absorbance of the color-developed seed at the maximum absorption wavelength exhibited in this saturated color-developed state was reduced to half was measured. For evaluation of color storage stability, the recording layer was irradiated with ultraviolet rays until the saturated absorbance was reached, and the time in which the absorbance at the maximum absorption wavelength exhibited in the saturated color-developed state was reduced to half was measured. The results of these measurements are shown in Table 1.

The color-developed seed of Example 1 was very stable and was not discolored during storage in a dark place at ordinary temperature for 3000 hours.

Examples 2 to 6

A solution containing the spiropyran compound No. [VI]-(3) and each of the carboxylic acid metallic complexes shown in Table 1 was applied to a glass base to form an optical information recording medium based on the same method as Example 1. Each of the recording medium thereby obtained was color-developed by being irradiated with ultraviolet rays ($\lambda$: about 360 nm) and was returned to the uncolored state by being irradiated with visible rays. This change could be observed during repeated use of the recording medium.

The photostability and the storage stability of each optical information recording medium were measured. The results of these measurements are shown in Table 1. For the measurement of the absorbance, a spectrophotometer (U-3400: a product of Hitachi Ltd.) was used.

Example 7

An optical information recording medium was obtained in the same manner as Example 6 except that cellulose acetate (a product of Teijin Ltd.) was used in place of vinyl chloride-vinylidene chloride copolymer in the solution having a solvent of a mixture of tetrahydrofuran and cyclohexane mixed at a ratio of 2:1 (by volume). The recording medium obtained was evaluated in the same manner as Example 1. The results of this evaluation are shown in Table 1.

Reference Examples 1, 2

Two information recording mediums were formed by using the spiropyran compound [VI]-(3) based on Example 1; one of these recording mediums was formed without adding any carboxylic acid metallic complex, and the other was formed by using zinc salt of benzoic acid. The photostability and the storage stability of these recording mediums were evaluated in the same manner as in the above.

TABLE 1

| Spiropyran compound No. | Carboxylic acid metallic complex | Maximum absorption wavelength (λmax) of color-developed seed | Photo-stability | Storage stability |
|---|---|---|---|---|
| Ex. 1 | [VI]-(3) — naphthalene with COO and O coordinated to Zn | 610 nm | No discoloration | No discoloration (3000 hr) |
| Ex. 2 | " — naphthalene-2,3-COO/O–Zn | 610 | No discoloration | No discoloration (3000 hr) |
| Ex. 3 | " — naphthalene-2,3-COO/O–Ni | 610 | 20 min. or longer | 15 min. |
| Ex. 4 | " — benzene-1,2-di-COO–Zn | 610 | 9 min. | 16 min. |
| Ex. 5 | " — naphthalene with O and COO coordinated to Zn | 610 | 10 min. | 3000 hr. or longer |
| Ex. 6 | " — benzene-COO/O–Zn | 610 | 5 min. | 23 min. |
| Ex. 7 | " | " | 610 | 7 min. | 12 min. |
| Ref. Ex. 1 | " | — | 610 | 4 min. | 12 min. |
| Ref. Ex. 2 | " | two phenyl-COO groups–Zn | 610 | 4 min. | 5 min. |

Example 8

3 parts by weight of the spiropyran compound No.[IV]-(2), 0.3 part by weight of zinc salt of 1-hydroxy-2-naphthoic acid expressed by a formula:

and provided as a carboxylic acid metallic complex and 10 parts by weight of vinyl chloride-vinylidene chloride copolymer (Denkavinyl #1000W: a product of Denki Kagaku Kogyo K. K) were dissolved in 100 parts by weight of a solvent consisting of a mixture of tetrahydrofuran and cyclohexane mixed at a ratio of 2:1 (by volume). This solution was applied to a glass base by spin coating and was dried in vacuum at 75° C. for an hour, thereby forming an optical information recording medium with a recording layer having a thickness of 1000 Å. This medium was selectively irradiated with ultraviolet rays having a wavelength of about 360 nm by using a 500 Watt ultrahigh voltage mercury lamp (manufactured by Ushio Inc.) and filters (UV-36C, IRA-255: products of Toshiba Corp. ) , and the irradiated portion was color-developed in deep green ($\lambda max=690$ nm) in a saturated color-developed state.

When the recording layer in the colored state was irradiated with visible rays, the spiropyran was restored to its original state. It was thereby confirmed that the recording layer has a recording function. This change could be observed during repeated use of the recording medium.

The storage stability of this optical information recording medium was evaluated in the same manner as Example 1.

Examples 9 to 13

A solution containing each of the combinations of the spiropyran compounds and the carboxylic acid metallic complexes shown in Table 2 was applied to a glass base to form an optical information recording medium based on the same method as Example 1. Each recording medium thereby obtained was color-developed by being irradiated with ultraviolet rays ($\lambda$: about 360 nm) and was returned to the uncolored state by being irradiated with visible rays. This change could be observed during repeated use of the recording medium.

The storage stability of each optical information recording medium was measured in the same manner as Example 1.

Reference Examples 3, 4

Optical information recording mediums were formed in the same manner as Example 1 except that the spiropyran compounds [IV]-(7), [V]-(1) were used and that no carboxylic acid metallic complex was used. Each optical information recording medium was evaluated in the same manner as example 1.

Reference Example 5

3 parts by weight of the spiropyran compound [V]-(1) and 0.3 part by weight of carboxylic acid were used for forming an optical information recording medium in the same manner as Example 1. The storage stability of this medium was evaluated in the same manner as Example 1.

TABLE 2

| | Spiropyran compound No. | Carboxylic acid metallic complex | Maximum absorption wavelength ($\lambda max$) of color-developed seed | Storage stability |
|---|---|---|---|---|
| Ex. 8 | [IV]-(2) | (structure with COO-Zn-O) | 690 nm | No change (3000 hr.) |
| Ex. 9 | [IV]-(7) | (structure with COO-Zn-O) | 780 | No change (3000 hr.) |

TABLE 2-continued

| | Spiropyran compound No. | Carboxylic acid metallic complex | Maximum absorption wavelength (λmax) of color-developed seed | Storage stability |
|---|---|---|---|---|
| Ex. 10 | [V]-(1) |  | 580 | 2000 hr. |
| Ex. 11 | [VI]-(4) |  | 626 | 3000 hr. or longer |
| Ex. 12 | [IV]-(8) |  | 570 | 2000 hr. |
| Ex. 13 | [V]-(5) |  | 578 | 3000 hr. or longer |
| Ref. Ex. 3 | [IV]-(7) | — | 780 | 30 hr. |
| Ref. Ex. 4 | [V]-(1) | — | 580 | 2 hr. |
| Ref. Ex. 5 | [V]-(1) | $C_{17}H_{35}COOH$ | 550 | 10 hr. |

Example 14

A solution prepared by mixing 4 parts by weight of the spiropyran compound No.[IV]-(7), 0.4 part by weight of zinc salt of 2-hydroxy-3-naphthoic acid expressed by a formula:

and provided as a carboxylic acid metallic complex and 12 parts by weight of vinyl chloride resin was applied to a glass base having a thickness of 1.2 mm and a diameter of 130 mm and was dried in vacuum at 75° C. for 30 minutes. The whole surface of a recording layer of an optical information recording medium thereby formed was irradiated with ultraviolet rays to be color-developed.

The optical information recording medium thus prepared was mounted on a turn table. While the turn table was being rotated at 900 rpm by a motor, the recording layer was irradiated, from the side of the base, with laser light of a wavelength of 780 nm produced by a semiconductor laser with a recording power of 8 mW at a recording frequency of 1 MHz to change the irradiated portion into a color-developed seed, thereby recording information. Thereafter, the information was reproduced with light of 780 nm, and the reproduced waveform was analyzed by employing a spectrum analyzer to measure C/N ratio. As a result, a preferable C/N ratio of 51 dB was achieved.

What is claimed is:

1. An optical information recording medium comprising a base and a recording layer, the recording layer containing a spiropyran compound expressed by the following formula:

where X is substituted or unsubstituted C; Y is O; Z is N; each of the rings A and B is an aromatic ring which may be substituted; and each of $R_1$ and $R_2$ is a hydrogen atom, a halogen atom or a univalent organic residue, and a carboxylic acid metallic complex expressed by the following formula:

and a cellulose ester.

2. An optical information recording medium according to claim 1, wherein the spiropyran compound is a compound of the following formula:

[VI]

where each of $R_1$ to $R_{10}$ is a hydrogen atom, a halogen atom or a univalent organic residue, each of combinations of $R_3$ and $R_4$, $R_4$ and $R_5$, $R_5$ and $R_6$, $R_7$ and $R_8$, $R_8$ and $R_9$, and $R_9$ and $R_{10}$ may be a fused ring condensed with the aromatic ring or the heterocyclic ring, and X is substituted or unsubstituted C.

3. An optical information recording medium according to claim 1, wherein the recording layer contains 1 to 60% by weight of the carboxylic acid complex.

4. An optical information recording medium according to claim 3, wherein the recording layer contains 5 to 50% by weight of the carboxylic acid complex.

5. An optical information recording medium according to claim 1, wherein an undercoat layer is formed between the base and the recording layer.

6. An optical information recording medium according to claim 1, wherein a protective layer is formed on the recording layer.

* * * * *

UNITED STATES PATENT AND TRADEMARK OFFICE
CERTIFICATE OF CORRECTION

PATENT NO. : 5,512,423
DATED : April 30, 1996
INVENTOR(S) : KITAO ET AL.

It is certified that error appears in the above-indentified patent and that said Letters Patent is hereby corrected as shown below:

COLUMN 3:

Line 16, "hetrocylic" should read --heterocyclic--;
Line 17, "used" should read --be used--;
Line 28, "prevent of" should read --prevent the--; and
Line 32, "Examples" should read --¶ Examples--.

COLUMN 4:

Line 44,

Line 51,

UNITED STATES PATENT AND TRADEMARK OFFICE
CERTIFICATE OF CORRECTION

PATENT NO. : 5,512,423
DATED : April 30, 1996
INVENTOR(S) : KITAO ET AL.

It is certified that error appears in the above-indentified patent and that said Letters Patent is hereby corrected as shown below:

COLUMN 5:

Line 2, "$H_3C_2$" should read --$H_5C_2$--; and

Line 34,

COLUMN 7:

Line 43, "formula "[IV]" should read --formula [IV],--; and
Line 44, ", [V]," should read --[V],--.

COLUMN 8:

Line 52, "hetorocyclic" should read --heterocyclic--; and
Line 65, "is" should read --are--.

COLUMN 13:

Line 30, "Specifically;" should read --Specifically,--;
Line 36, "barayta" should read --baryta--; and
Line 39, "in" should be deleted.

UNITED STATES PATENT AND TRADEMARK OFFICE
CERTIFICATE OF CORRECTION

PATENT NO. : 5,512,423      Page 3 of 3
DATED : April 30, 1996
INVENTOR(S) : KITAO ET AL.

It is certified that error appears in the above-indentified patent and that said Letters Patent is hereby corrected as shown below:

Column 14,

Line 15, "100Å or more or" should be deleted.

Column 17,

Table 1, In Ex. 7, "12 min." should read --50 min.--.

Signed and Sealed this

Seventh Day of January, 1997

Attest:

BRUCE LEHMAN

Attesting Officer     Commissioner of Patents and Trademarks